United States Patent
Takayanagi (10) Patent No.: US 7,825,982 B2
(45) Date of Patent: Nov. 2, 2010

(54) OPERATION STABILIZED PIXEL BIAS CIRCUIT

(75) Inventor: Isao Takayanagi, Tokyo (JP)

(73) Assignee: Aptina Imaging Corporation, Grand Cayman (KY)

( * ) Notice: Subject to any disclaimer, the term of this patent is extended or adjusted under 35 U.S.C. 154(b) by 1903 days.

(21) Appl. No.: 10/868,887

(22) Filed: Jun. 17, 2004

(65) Prior Publication Data
US 2005/0280737 A1   Dec. 22, 2005

(51) Int. Cl.
*H04N 5/217* (2006.01)
(52) U.S. Cl. ..................................... 348/372
(58) Field of Classification Search ................. 348/372, 348/257, 261; 327/535, 537, 538
See application file for complete search history.

(56) References Cited

U.S. PATENT DOCUMENTS

| | | | |
|---|---|---|---|
| 4,937,674 A | | 6/1990 | Mizoguchi et al. |
| 5,920,345 A | * | 7/1999 | Sauer .......................... 348/308 |
| 6,130,423 A | * | 10/2000 | Brehmer et al. .......... 250/208.1 |
| 6,410,900 B1 | | 6/2002 | Okamoto .................. 250/208.1 |
| 6,437,824 B1 | * | 8/2002 | Suzuki et al. ............. 348/222.1 |
| 6,493,030 B1 | * | 12/2002 | Kozlowski et al. .......... 348/310 |
| 6,512,543 B1 | | 1/2003 | Kuroda et al. |
| 6,650,369 B2 | * | 11/2003 | Koizumi et al. ............. 348/301 |
| 6,791,612 B1 | * | 9/2004 | Hwang ........................ 348/308 |
| 6,798,231 B2 | * | 9/2004 | Iwasaki et al. .............. 324/770 |
| 6,881,994 B2 | | 4/2005 | Lee et al. |
| 7,038,820 B1 | * | 5/2006 | Kindt et al. ................. 358/474 |
| 7,268,815 B1 | * | 9/2007 | Meynants .................... 348/294 |
| 2002/0030528 A1 | * | 3/2002 | Matsumoto et al. ......... 327/331 |
| 2003/0011695 A1 | * | 1/2003 | Roustaei ..................... 348/310 |
| 2003/0179159 A1 | | 9/2003 | Ohsawa et al. |
| 2004/0004591 A1 | * | 1/2004 | Akimoto et al. ................ 345/84 |
| 2004/0080664 A1 | * | 4/2004 | Riccardi et al. ............. 348/372 |
| 2004/0135596 A1 | * | 7/2004 | Miyagawa et al. .......... 324/770 |
| 2004/0201550 A1 | * | 10/2004 | Nakamura et al. ............ 345/55 |
| 2005/0012762 A1 | * | 1/2005 | Tobita ......................... 345/690 |
| 2006/0214890 A1 | * | 9/2006 | Morishige et al. ............. 345/77 |

FOREIGN PATENT DOCUMENTS

| | | |
|---|---|---|
| EP | 0 865 197 A2 | 9/1998 |
| JP | 1135274 | 5/1989 |
| JP | 10-257392 | 9/1998 |
| JP | 2000-4399 A | 1/2000 |
| JP | 2000-59691 | 2/2000 |
| JP | 2003-23144 | 1/2003 |
| JP | 2003-259219 | 9/2003 |

OTHER PUBLICATIONS

Japanese Office Action dated Oct. 20, 2009.
Office Action of May 18, 2010, in Japanese Patent Application No. 2004-161337.

* cited by examiner

*Primary Examiner*—John M Villecco
*Assistant Examiner*—Kent Wang
(74) *Attorney, Agent, or Firm*—Dickstein Shapiro LLP (57) ABSTRACT

A pixel bias current supply for supplying a stable source of bias current to pixels of an imager includes a current bypass feature for improving stability when one or more pixels of an imager saturates. The pixel bias current supply also features voltage limiters to restrict the output voltage of a pixel in order to prevent reverse video from being output when very strong light is incident upon one or more pixels.

22 Claims, 11 Drawing Sheets

OPERATION STABILIZED PIXEL BIAS CIRCUIT

FIELD OF INVENTION

The present invention relates generally to semiconductor imagers. More specifically, the present invention relates to methods and apparatus for improving bias current stability in an imager.

BACKGROUND OF THE INVENTION

Figure 1:
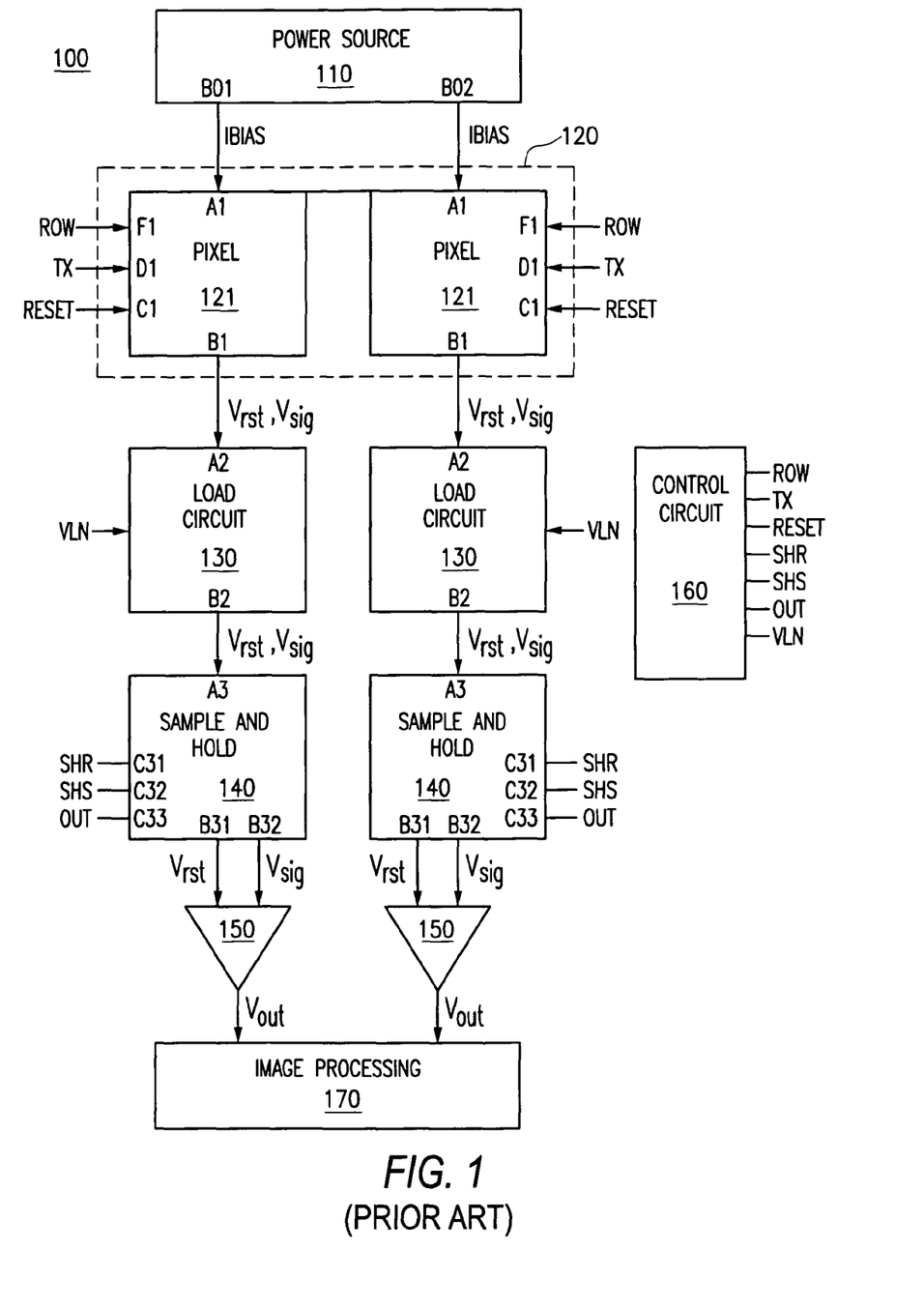
FIG. 1 is a block diagram of a conventional imager.

FIG. 1 illustrates a conventional imager 100 in block diagram form. As illustrated, the imager 100 includes a power source 110, a pixel array 120 including a plurality of pixels 121, a plurality of load circuits 130, a plurality of sample and hold circuits 140, and a plurality of amplifiers 150. Typically, there are numerous pixels 121 arranged in a plurality of rows and columns. However, for simplicity, the pixel array 120 illustrated in FIG. 1 only includes two columns and one row of pixels 121. The power source 110 produces a bias current IBIAS at an array pixel voltage of VAAPIX. Load circuit 130 produces a bias current IBIAS and this bias current IBIAS is supplied to each pixel 121 of the imager 100. The imager 100 also includes a control circuit 160 for generating the illustrated control signals (e.g., ROW, TX, RESET, SHR, SHS, and OUT) and additional image processing circuitry 170 for further processing signals output by the pixels 121.

Figure 2:
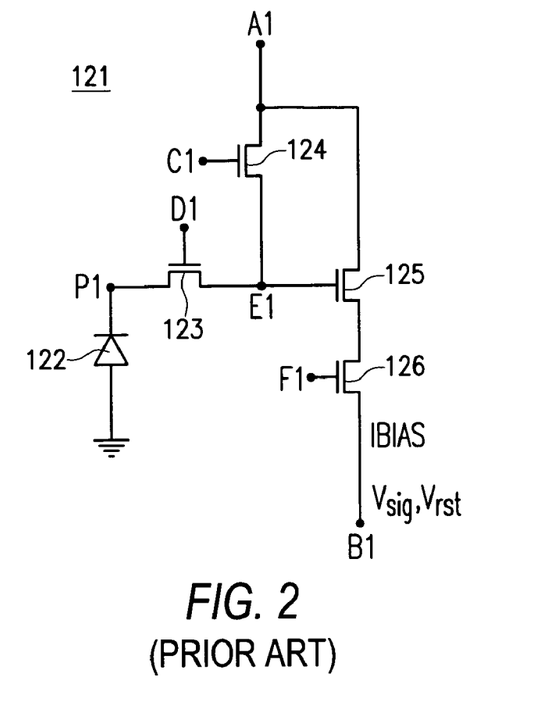
FIG. 2 is a circuit diagram of a conventional pixel.

Now also referring to FIGS. 2-5, the operation of the imager 100 is explained. FIG. 2 illustrates a conventional four transistor pixel 121. The pixel 121 includes a photodiode 122, a transfer transistor 123, a reset transistor 124, a source follower transistor 125, and a row select transistor 126. The pixel 121 accepts the ROW control signal at node F1 (coupled to the gate of the row select transistor 126), the TX control signal at node D1 (coupled to the gate of the transfer transistor 123) and the RESET control signal at node C1 (coupled to the gate of the reset transistor 124). The pixel 121 accepts at node A1 power from an output node (e.g., nodes B01 or B02) of the power source 110 and produces reset "$V_{rst}$" and photo "$V_{sig}$" signals as outputs at node B1. As described in greater detail below, the pixel 121 also includes a charge detection node E1.

Figure 5:
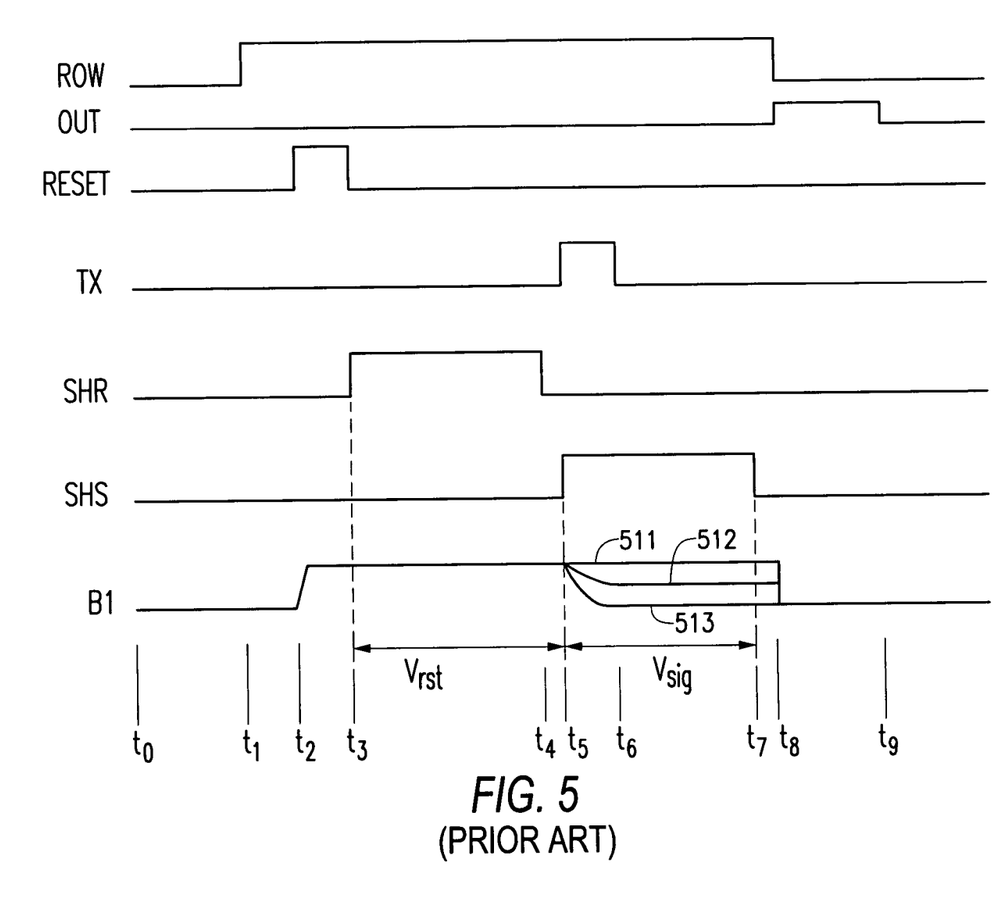
FIG. 5 is a timing diagram regarding the operation of the imager of FIG. 1.

Now also referring to the timing diagram of FIG. 5, it can be seen that initially (i.e., at time t0), control signals ROW, RESET, TX, SHR, and SHS are not asserted (i.e., at a logical low level).

At time t1, the ROW control signal is asserted and supplied to node F1 to activate row select transistor 126.

At time t2, the RESET control signal is asserted, causing voltage VAAPIX supplied from the power supply 110 at node A1 to be applied to the charge detection node E1. Since node E1 is coupled to the gate of transistor 125 and node F1 is coupled to the gate of transistor 126, both transistors 125 and 126 conduct. As a result, the reset signal $V_{rst}$ is output at node B1.

At time t3, the control signal RESET is deasserted and the charge detection node E1 becomes floating. The photodiode 122 has already accumulated charge at node P1 while it has been exposed to light since the last initialization. This exposure period is also known as an integration period.

At time t5, the control signal TX is asserted, causing charge transfer from the node P1 to the charge detection node E1. As a result, this charge is dumped to node E1. This charge decreases the voltage at node E1, and affects the conductivity of the source follower transistor 125. Since row select transistor 126 is still conducting, a photo signal $V_{sig}$ based on the transferred charge at node E1 is output at node B1. In FIG. 5, the variability of the photo signal $V_{sig}$ at node B1 is illustrated by three traces 511, 512, 513. The top trace 511 indicates the output at B1 if the photodiode 122 was exposed to little if any light during the integration period. The middle trace 512 corresponds to moderate light exposure during the integration period. The bottom trade 513 corresponds to strong light exposure during the integration period.

At time t8, the ROW control signal is deasserted, causing the row select transistor 126 to become non-conducting. As a result, the output at node B1 is shut off.

The pixel 121 therefore produces two output signals, namely a reset signal $V_{rst}$ and a photo signal $V_{sig}$. The two signals $V_{rst}$ and $V_{sig}$ are produced at different times, but both signals are output at node B1. The outputs of the pixel 121 are routed to a load circuit 130, so that the source follower transistor 125 and the load circuit comprise a voltage follower circuit when the ROW control signal is asserted.

Figure 3:
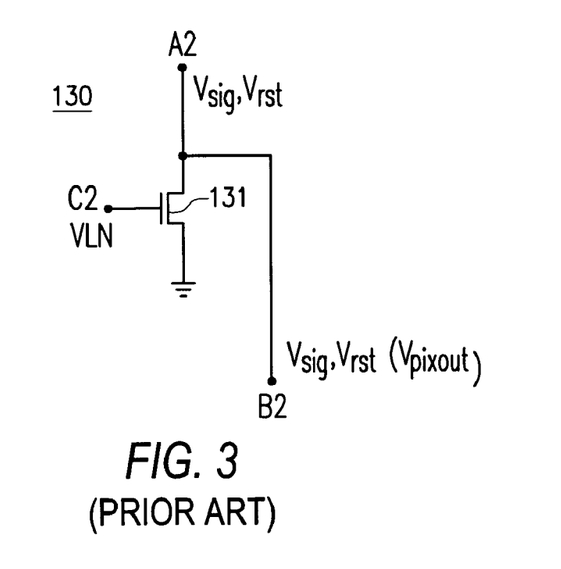
FIG. 3 is a circuit diagram of a conventional load circuit.

FIG. 3 illustrates the load circuit 130 used in the imager 100. The circuit 130 is a current sink for the output of the pixel circuit 121. As illustrated, the load circuit 130 accepts the output signals $V_{rst}$, $V_{sig}$ of the pixel 121 at node A2 and produces corresponding outputs at node B2. The output of the load circuit 130 is generically referred to as $V_{pixout}$, which corresponds to a modified form of the reset signal between times t3 and t5 and corresponds to a modified form of the photo signal between times t5 and t8. The transistor 131 has its gate coupled to node C2, which accepts a control signal VLN. The control signal VLN is used to adjust the bias current generated by the transistor 131 and for optimizing the performance of the source follower circuit with regard to power consumption and speed. This transistor 131 is often referred to as a biasing transistor.

Figure 4:
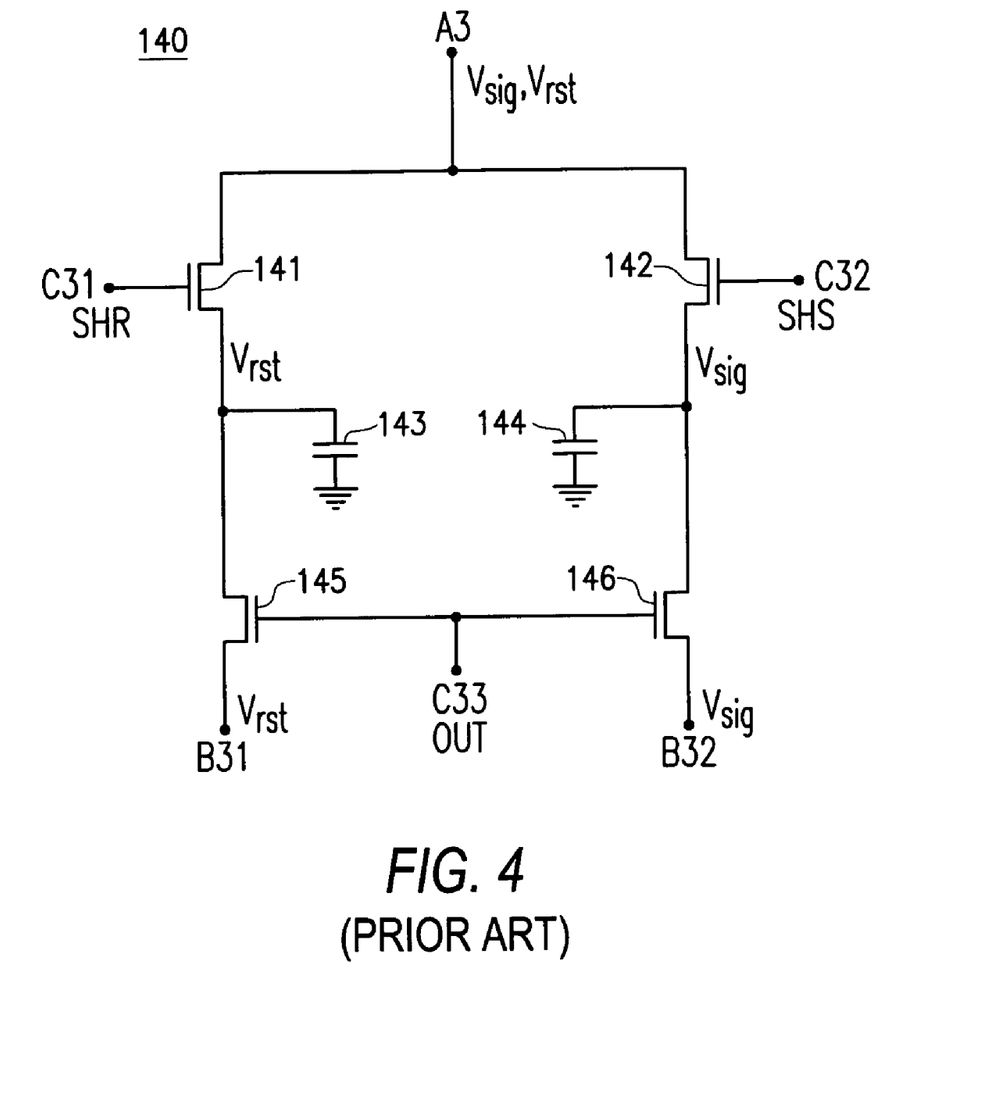
FIG. 4 is a circuit diagram of a conventional sample and hold circuit.

FIG. 4 is a circuit diagram of the sample and hold circuit 140. The function of the sample and hold circuit 140 is to sample and hold the reset and photo signals Vrst, $V_{sig}$ of pixel 121 and output a corresponding differential signal. The differential signal output by the sample and hold circuit 140 has as its components the reset signal Vrst (at node B31) and the photo signal $V_{sig}$ (at node B32). The operation of the sample and hold circuit 140 is described below.

At time t3 (FIG. 5), the sample and hold circuit 140 accepts at node A3 the reset signal Vrst and the SHR control signal transitions from low to high. The OUT control signal and the SHS control signal are both low, so transistors 142, 145, and 146 are non-conducting while transistor 141 conducts. Accordingly, the reset signal Vrst charges capacitor 143, and is thus stored on capacitor 143.

At time t4 (FIG. 5), the SHR control signal transitions from high to low, causing transistor 141 to become non-conducting.

At time t5 (FIG. 5), the SHS control signal transitions from low to high. The OUT control signal and the SHR control signal are both low, so transistors 141, 145, and 146 are non-conducting while transistor 142 conducts. Accordingly, the photo signal $V_{sig}$ charges capacitor 144, and is thus stored on capacitor 144.

At time t7 (FIG. 5) the SHS control signal transitions from high to low, causing transistor 142 to become non-conducting.

At time t8 (FIG. 5), the OUT control signal transitions from low to high, causing transistors 145 and 146 to conduct. Since the SHR and SHS control signals are both low, transistors 141 and 142 are non-conducting. Accordingly, charge from capacitors 143 and 144 begins to respectively and simultaneously flow to nodes B31 and B32 via transistors 145 and 146. For simplicity, the signal arising from charge flowing from capacitor 143 to node B31 is labeled as Vrst while the signal arising from charge flowing from capacitor 144 to node B32 is labeled as $V_{sig}$.

Now referring back to FIG. 1, it can be seen that the $V_{sig}$ and Vrst signals, respectively output from nodes B31 and B32, are supplied to a differential amplifier 150, which produces a single ended output $V_{out}$. The $V_{out}$ signal is representative of the output of a pixel 121 and can be supplied to the image processing circuit 170 for digitization, digital processing, and storage.

At time t9 (FIG. 5), the OUT control signal transitions from high to low, causing transistors 145 and 146 to stop conducting.

Figure 6:
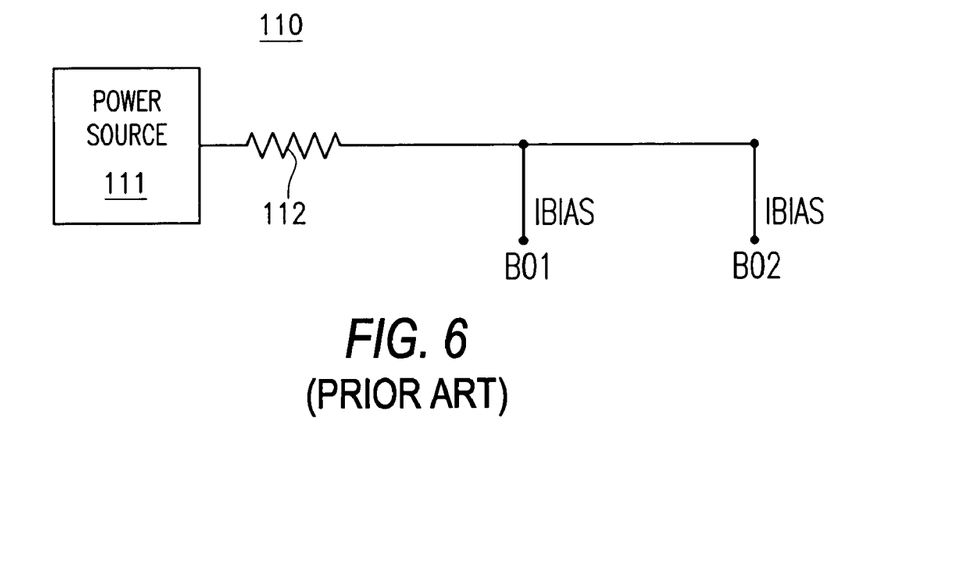
FIG. 6 is a circuit diagram of a conventional bias current supply circuit.

FIG. 6 is a block diagram of a conventional power source 110. As illustrated, the power source 110 includes a power source 111 which is coupled to a resistor 112. The resistor 112 represents the output resistance of the power source 111 and any parasitic components between the power source 112 and nodes B01 and B02. The circuit 110 outputs at nodes B01 and B02 a bias current IBIAS at a predetermined voltage VAAPIX.

One problem associated with the above described imager 100 is that when a pixel 121 is exposed to very bright light, the charge transferred from node P1 to node E1 can decrease the voltage at node E1 from the reset voltage (i.e., VAAPIX) to a ground voltage, causing the source follower transistor 125 to become non-conducting. This phenomenon is known as saturation. In an imager 100, pixel saturation causes a cut-off of the bias current. This results in a fluctuation in the voltage of the output signal at nodes B01, B02 of the power source 110. Since the power source 110 is coupled to multiple pixels 121, saturation of one or more pixels 121 can affect the output of other pixels 121. In particular, saturation of one or more pixels may manifest in the image produced by the imager 100 as unstable horizontal band-wise noise.

Another problem associated with the above described imager 100 occurs when extremely bright light, such as sunlight, is incident upon the pixel 121. This saturates the photodiode 122 by causing the photodiode to produce a very large current flow. This current flow can overflow through the transfer transistor 123 to the charge detection node E1. Additionally, the source junction of the reset transistor 124 also generates photo current between node E1 and the substrate, which causes the voltage at node E1 to drop off when the reset transistor is turned off. In fact, under such strong illumination conditions, the voltage at node E1 decreases after the reset transistor turns off at time t3 (FIG. 5), causing a drop in the level of the reset signal $V_{rst}$ between time t3 and t4, which is stored in capacitor 143 when control signal SHR is deasserted at time t4 (FIG. 5). The photo signal $V_{sig}$ is always saturated under such strong light conditions. That is, the photo signal $V_{sig}$ is set to a minimum level near ground potential. The decrease in the reset signal $V_{rst}$ level causes a reduction of the $V_{out}$ signal since $V_{out}$ is equal to $V_{sig}$-$V_{rst}$. Thus, a very bright light incident upon a pixel may result in a decrease in the output signal, which ultimately manifests as a negative photoconversion response. This phenomenon is also known as reverse video noise.

Accordingly, there is a need for a bias current supply circuit for use in an imager which is capable of producing a more stable pixel bias current independent of the amount of light incident upon the pixels of an imager. There is also a need for a bias current supply circuit which is resistant to reverse video noise when imaging extremely bright objects.

SUMMARY OF THE INVENTION

Exemplary embodiments of the method and apparatus of the present invention provide a power source that provides a stabilized pixel bias current supply in an imager. The power source features a current bypass circuit to prevent bias current cut-off from adversely affecting the stability of the output of the power source. The power source also features a voltage limiter to prevent a pixel from outputting an out of range output voltage when very strong light is incident upon the pixel.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 7A:
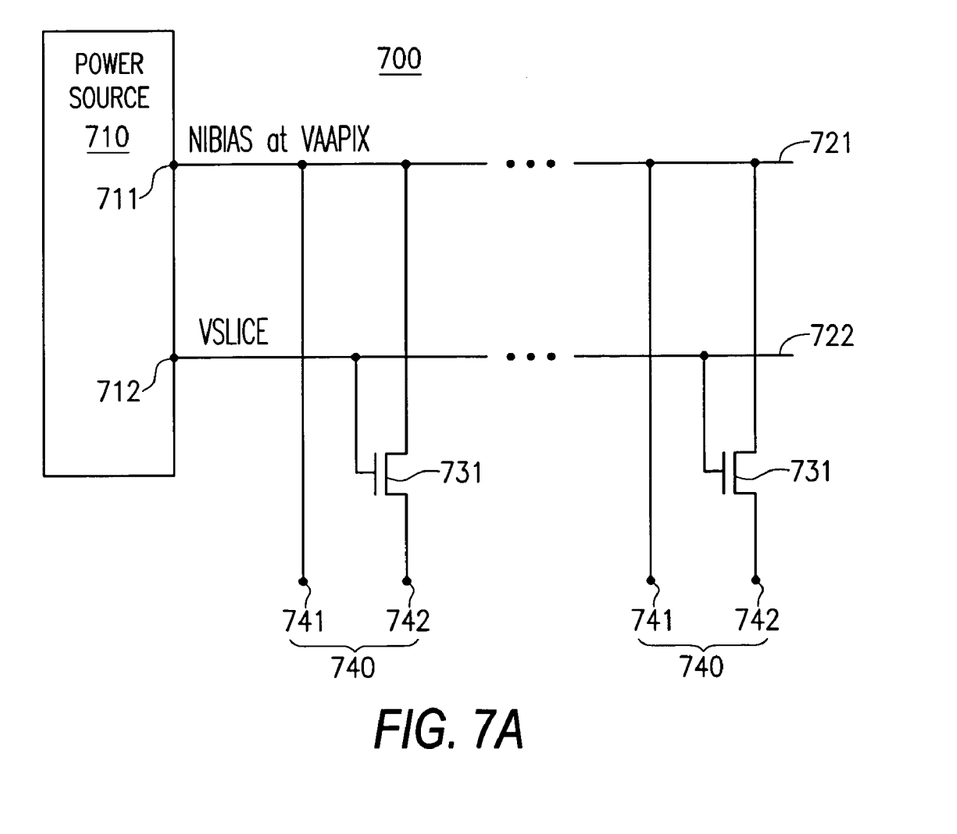
FIG. 7A is a circuit diagram of a bias current supply circuit in accordance with a first exemplary embodiment of the invention.

Now referring to the drawings, where like reference numerals designate like elements, there is shown in FIG. 7A a circuit diagram of a bias current supply circuit 700 in accordance with a first exemplary embodiment of the invention.

The bias current supply circuit 700 includes a plurality of taps 740. More specifically, there are n taps 740, where n corresponds to the number of columns that receive power from the bias current supply circuit 700. The bias current supply circuit 700 provides each tap 740 with the IBIAS current at node 741, which is coupled to node A1 (FIG. 2) of each pixel 121. The voltage VAAPIX is supplied from node 711 of the power source 710. Node 711 is coupled to line 721, which is coupled to each node 741. The power source 710 must be capable of providing the output current of NIBIAS at VAAPIX voltage. The current level of the NIBIAS current must be at least n times the IBIAS current. The power source 710 also produces another output signal VSLICE at node 712. Node 712 is coupled to line 722, which is coupled to a gate of each transistor 731 in circuit 700. Each transistor 731 has one source/drain coupled to line 721 and another source/drain coupled to a respective node 742. Each node 742 is a output node coupled to node B1 of an associated pixel 121 (FIG. 2).

The signal VSLICE is at a voltage level of VS, where VS is greater than VT, the threshold voltage of transistor 731. When the imager 100 is operated using the power source 700, when dark or medium light is incident upon the pixel 121, the photo signal $V_{sig}$ voltage will be greater than the VS-VT voltage. As a result, transistor 731 will be non-conducting. Thus, when dark or medium light is incident upon the pixel 121, the imager 100 operates as previously described with respect to FIG. 5.

When bright light is incident upon the pixel 121, as previously discussed, the source follower transistor 125 in the pixel 121 becomes non-conducting and thus the IBIAS current no longer flows through node 741 to node A1 of the pixel 121. However, at the same time the photo signal $V_{sig}$ voltage will also drop below the VS-VT voltage, thereby causing transistor 731 to conduct. Since one source/drain of transistor 731 is coupled to line 721 and another source/drain is coupled to node B1 of pixel 121, the circuit formed by transistor 731 acts as a current bypass from node 741 to node 742 that permits the IBIAS current to continue to flow to the pixel 121 even when source follower transistor 125 is non-conducting. As a result, the output current from the power source 710 remains constant, even when bright light is incident upon the pixel 121.

Figure 7B:
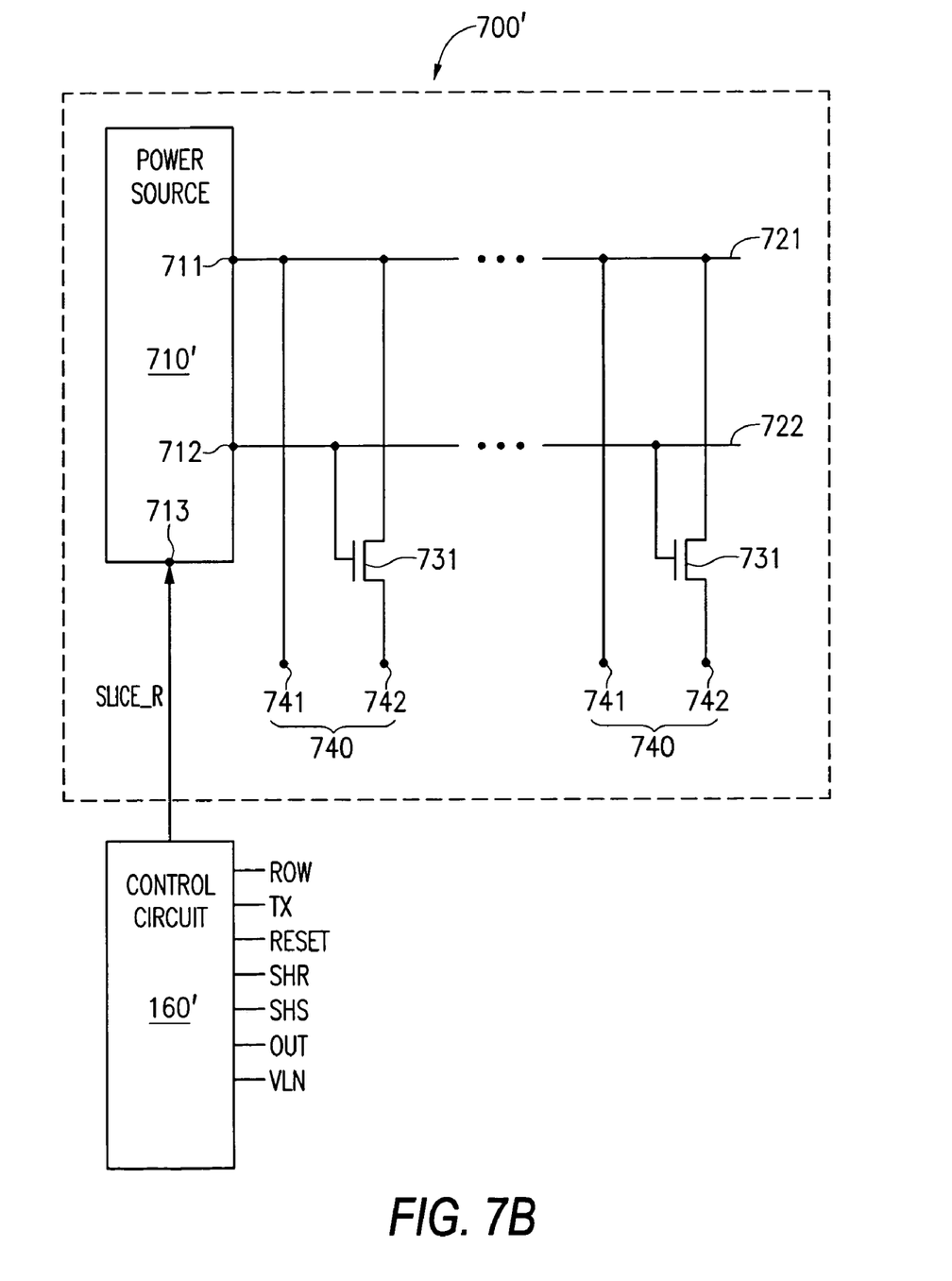
FIG. 7B is a circuit diagram of a bias current supply circuit in accordance with a second and a third exemplary embodiments of the invention.

While the FIG. 7A embodiment of the invention addresses and reduces the unstable horizontal band-wise noise, it does not address the reverse video noise. FIG. 7B is an illustration of a second exemplary embodiment of the present invention, which provides a way to reduce the reverse video noise. The second exemplary embodiment of the present invention utilizes a power source 700', which is similar to the bias current supply circuit 700 of the first exemplary embodiment. However, circuit 700' includes a new power source 710' and is intended to be used with a new control circuit 160'. The power source 710' is similar to the power source 710 of the first embodiment, but further includes a new control signal input node 713, which accepts a new control signal SLICE_R. The power source 710' is modified to control the output of the VSLICE control signal based upon the state of the SLICE_R control signal. The SLICE_R is control signal produced by a modified control circuit 160', which is similar to control circuit 160 (FIG. 1), but which also produces the SLICE_R signal. The characteristics of the SLICE_R signal are described below.

The SLICE_R control signal is supplied from the control circuit 160' to the power source 710'. When the SLICE_R control signal is asserted, the power source 710 outputs VR to the VSLICE signal. When the SLICE_R control signal is deasserted, the power source 710 does not output the VSLICE signal, that is, VSLICE is kept at ground potential.

Figure 8:
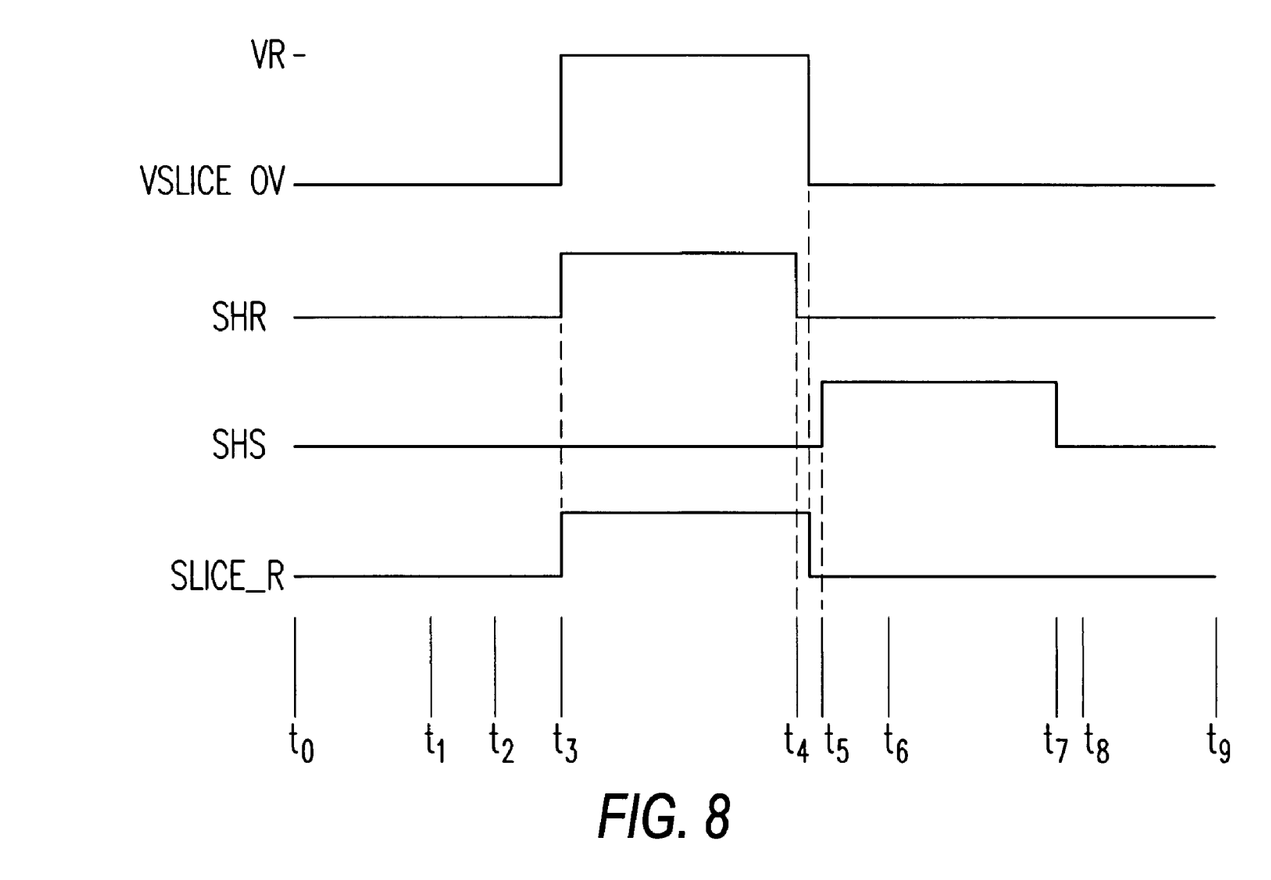
FIG. 8 is a supplemental timing diagram for operating the bias current supply circuit of FIG. 7B in accordance with a second exemplary embodiment of the invention.

As shown in the supplemental timing diagram of FIG. 8, the SLICE_R control signal is controlled so that it is asserted simultaneously with the assertion of the SHR control signal at time t3. The SLICE_R control signal is then deasserted at any time between the deassertion of the SHR control signal at t4 and the assertion of the SHS control signal at time t5. Thus, the SLICE_R control signal is asserted only during the reset phase of pixel operation. That is, the power source 710 is controlled to only output the VSLICE signal during the sampling and holding of the reset signal $V_{rst}$ (the reset phase). The presence of the VSLICE signal does not change the operation of the imager 100 when dark or normal level light is incident upon a pixel. However, when extremely bright light is incident upon a pixel, the presence of the VSLICE signal prevents the reset signal $V_{rst}$ voltage level from dropping below VSLICE-VT, thereby preventing the reset signal $V_{rst}$ level from being significantly affected by the extremely bright light. The reverse video noise is therefore addressed by preventing the reset signal $V_{rst}$ from being significantly affected when extremely bright light is incident upon the pixel 121.

Figure 9:
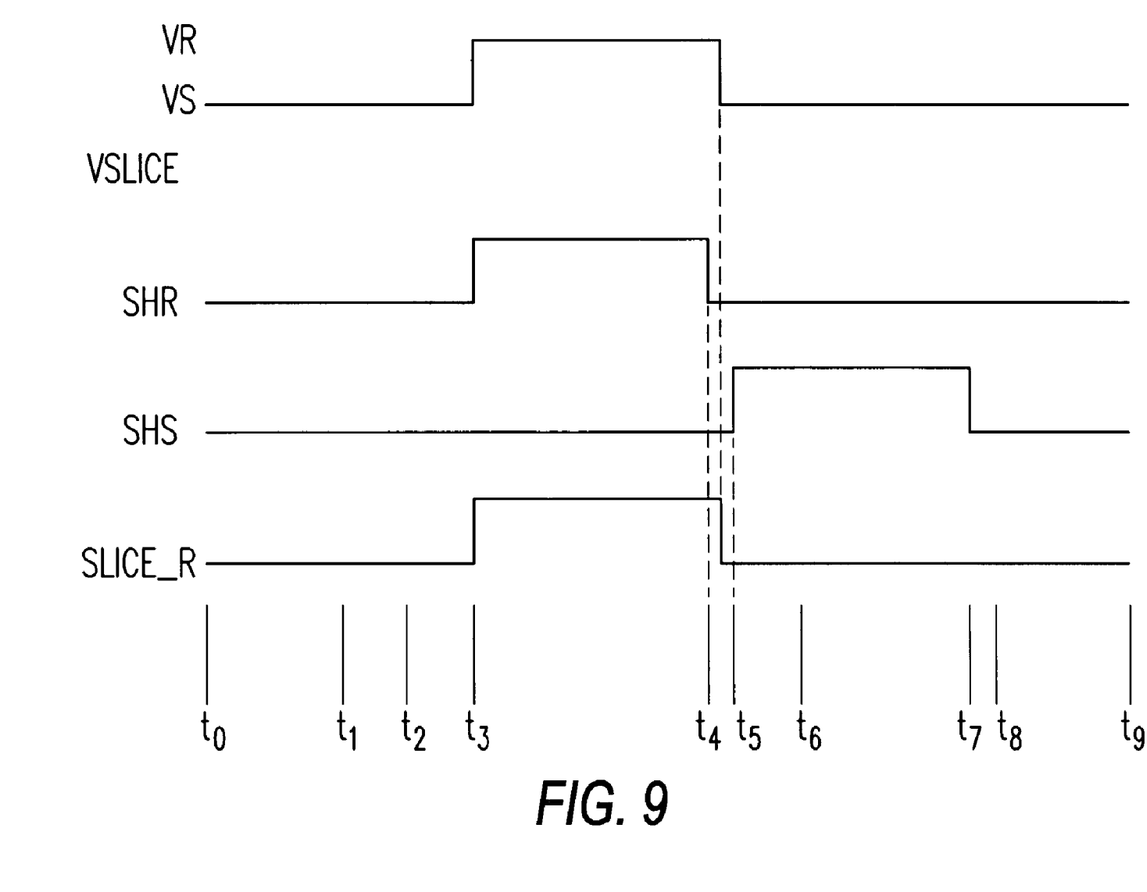
FIG. 9 is a supplemental timing diagram for operating the bias current supply circuit of FIG. 7B in accordance with a third exemplary embodiment of the invention.

Both the unstable load noise and the reverse video noise are addressed by a third exemplary embodiment of the present invention. The third exemplary embodiment utilizes the same bias current supply circuit 700' as the second exemplary embodiments (FIG. 7B). Referring now to the supplemental timing diagram of FIG. 9, it can be seen that the VSLICE signal is generally at the VS voltage level. However, when the SLICE_R control signal is asserted, the VSLICE signal is at the higher VR voltage level. By setting the VSLICE signal at the VR voltage level during the reset phase, the reverse video noise is reduced as explained above in connection with the second exemplary embodiment. Similarly, by setting the VSLICE signal at the VS voltage level during the photo signal phase, the unstable load noise is reduced as explained above with respect to the first exemplary embodiment. The third exemplary embodiment therefore combines elements of the first and second exemplary embodiments to address both the unstable load noise and reverse video noise.

Figure 10:
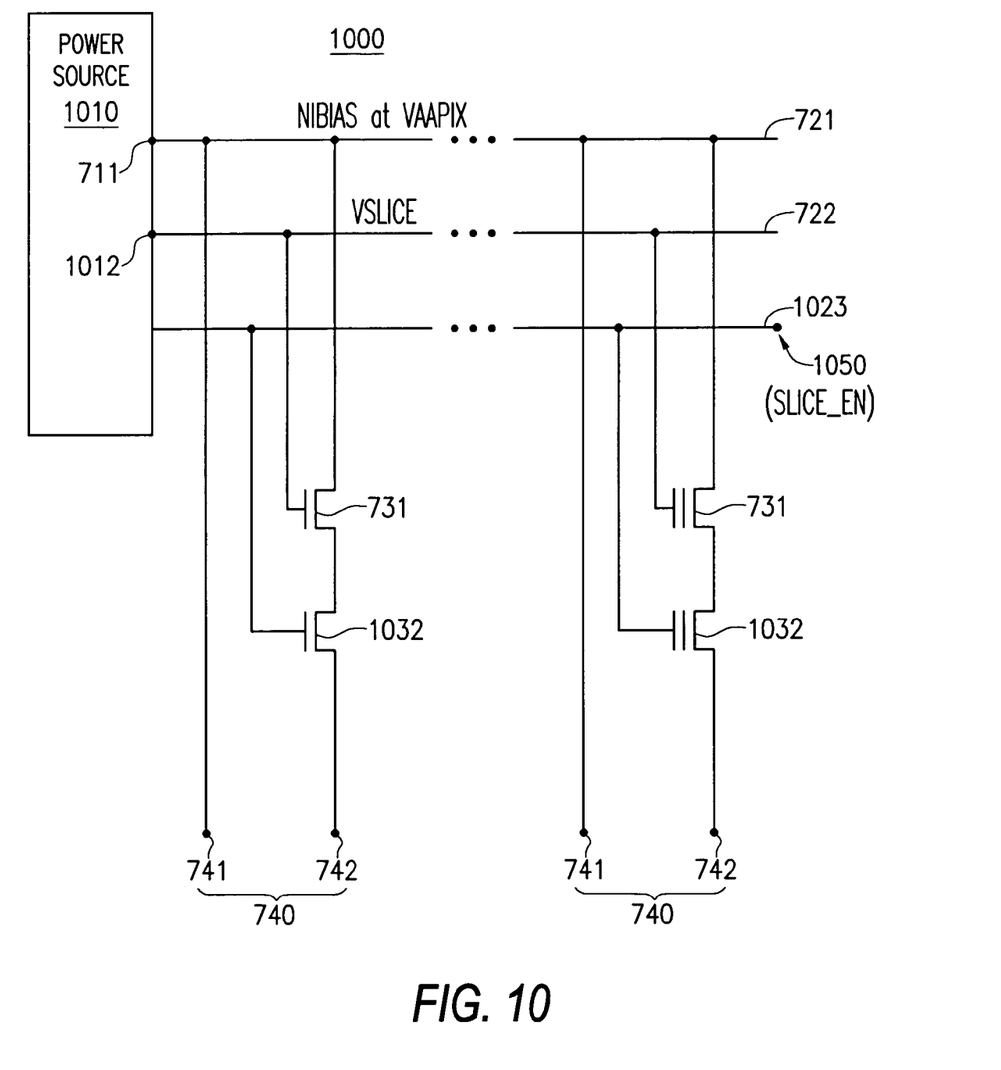
FIG. 10 is a circuit diagram of a bias current supply circuit in accordance with a fourth exemplary embodiment of the invention.

FIG. 10 illustrates a bias power supply circuit 1000 in accordance with a fourth exemplary embodiment of the present invention. The power supply circuit 1000 is capable of addressing the reverse video noise. The fourth exemplary embodiment operates similar to the second exemplary embodiment. However, the fourth exemplary embodiment utilizes a different mechanism of generating an output signal at node 742. While the second exemplary embodiment required power source 710 to be capable of sequencing the VSLICE signal between the VR and ground voltages, and use the VSLICE signal to control transistor 731 to govern the output at node 742, the power source 1010 of the bias power supply circuit 1000 is configured to output the VSLICE signal at a single voltage level at the VR voltage. An additional transistor 1032 is coupled in series, via its source and drain terminals, between a source/drain of transistor 731 and node 742. The gate of transistor 1032 is coupled to signal line 1023, which is also coupled to node 1050. The control circuit 160 (FIG. 1) is modified to also output the SLICE_EN control signal. The SLICE_EN control signal is used to control the conductivity of transistor 1032. Since the source/drain terminals of transistor 1032 are coupled in series between the source/drain terminals of transistor 731 and node 742, transistor 1032 can be used as a control device for the current flowing from the power source 1010 (at node 711) to node 742. More specifically, and referring also back to FIG. 8, the control circuit 160 is modified to output the SLICE_EN control signal in a manner so that the output at node 742 in this fourth exemplary embodiment is identical to the output at node 742 of the third exemplary embodiment.

Figure 11:
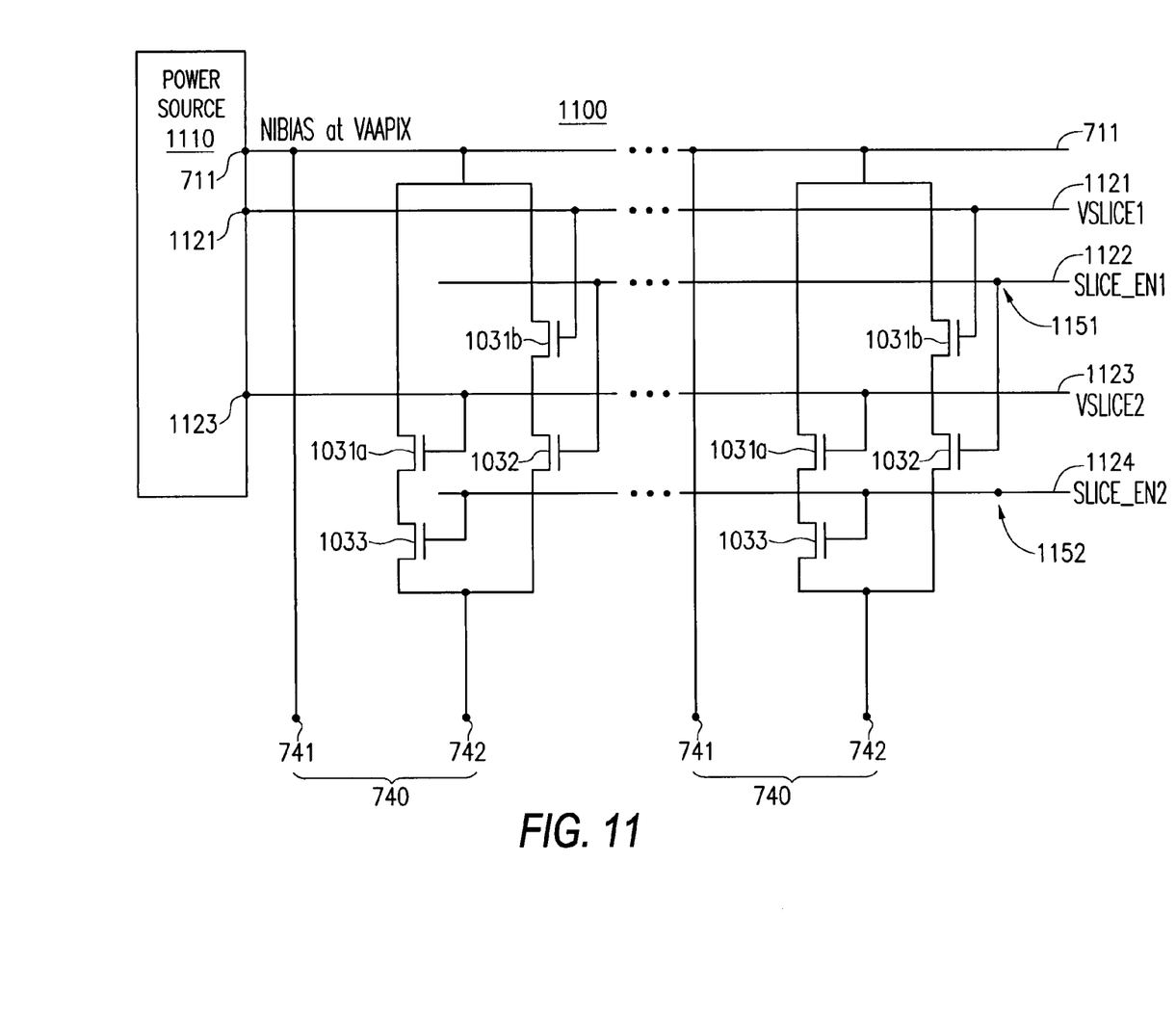
FIG. 11 is a circuit diagram of a bias current supply circuit in accordance with a fifth exemplary embodiment of the invention.

FIG. 11 illustrates a power source 1100 in accordance with a fifth exemplary embodiment of the present invention. The power source 1100 is capable of addressing both the unstable load noise and the reverse video noise (as in the third and fourth exemplary embodiments). The fifth exemplary embodiment operates similar to the third exemplary embodiment. However, the fifth exemplary embodiment utilizes a different mechanism of generating the output signal at node 742. The third exemplary embodiment controlled the output signal at node 742 by controlling the conductivity of transistor 731 by applying the VSLICE control signal to the gate of transistor 731. This required the power source 710 to be capable of sequencing the VSLICE control signal between the VR and VS voltages. In the fourth exemplary embodiment, the power source 1010 supplies the VSLICE control signal at a fixed voltage level VR. In the illustrated embodiment, the power source 1110 of the power source 1100 is configured to output the a VSLICE1 signal at the VR voltage level on an additional signal line 1121 and a VSLICE2 signal at the VS voltage level on an additional signal line 1123.

The power source 1100 utilizes four transistors 1031a, 1031b, 1032, and 1033 to control the output at node 742. More specifically, transistors 1031a and 1031b each operate similarly to transistor 731 (FIG. 7A). Transistor 1032 is coupled in series via its source and drain between a source/drain of transistor 1031b and node 742. Similarly, transistor 1033 is coupled in series via its source and drain between a source/drain of transistor 1031a and node 742. The control circuit 160 (FIG. 1) is modified to provide new SLICE_EN1 and SLICE_EN2 control signals respectively to the gates of transistor 1032 and 1033. The states of the SLICE_EN1 and SLICE_EN2 control signals are complementary and set by the control circuit 160 so that node 742 is supplied either the signal flowing from line 711 via transistors 1031a and 1033 or the signal flowing from line 711 via transistors 1031b and 1032. In this manner, the bias power supply circuit of 1000 produces an output signal at node 742 identical to that produced third exemplary embodiment.

Figure 12:
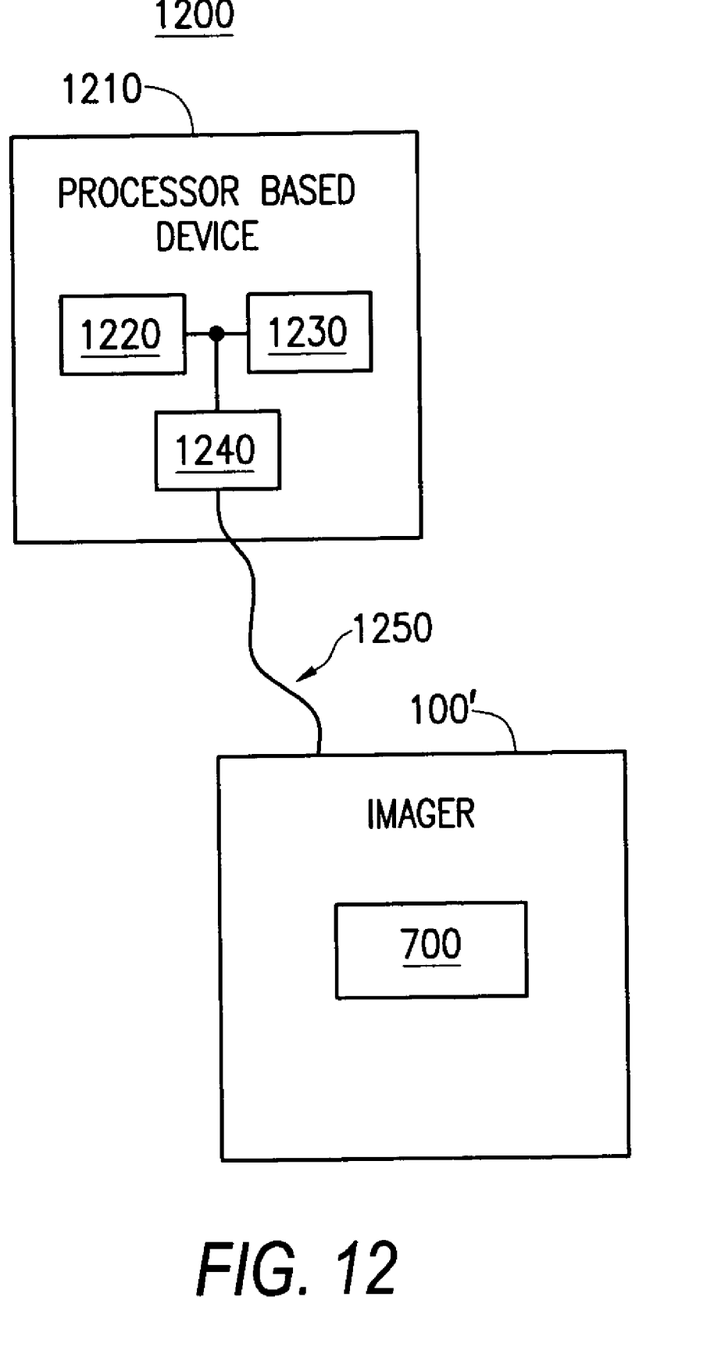
FIG. 12 is a block diagram of a processor based system incorporating the principles of the present invention.

FIG. 12 illustrates a processor system 1200. The processor system 1200 includes a processor device 1210. The processor device 1210 may be, for example, digital camera, a personal computer, or other image processing apparatus, and includes, for example, a central processing unit 1220, a memory 1230, and an I/O controller 1240. The memory 1230 may be a conventional memory. Alternatively, the memory 1230 may be, or may include, a removable memory, such as a removable flash memory device. The I/O controller is coupled to interconnect 1250, which couples the processor based device 1210 to an imager 100'. The imager 100' is similar to imager 100 (FIG. 1), but incorporates a bias current supply circuit in accordance with the principles of the present invention. As illustrated, the bias current supply circuit is circuit 700 of the first exemplary embodiment, but the bias current supply circuits of the other exemplary embodiments (e.g., circuits 700', 1000, or 1100) may be substituted for circuit 700.

The present invention therefore presents a number of embodiments for a pixel power supply circuit with addresses the unstable load and/or reverse video noise which may be encountered in any imaging system. The present invention addresses the unstable load noise by improving bias current stability via current bypass circuits which activate when the source follower is saturated. The present invention addresses the reverse video noise by using a voltage limiter at the pixel output node to limit the reset voltage output from a pixel.

While the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

The invention claimed is:
1. A power supply circuit, comprising:
a power source, said power source having a first node supplying a power signal and a second node supplying a first control signal; and
a plurality of taps, coupled in parallel to said power source, each one of said plurality of taps comprising:
a first output node, coupled to said first node;
a first transistor; and
a second output node,
wherein:
said first transistor is coupled in series via a source or drain region and a drain or source region between said first node and said second output node, and
a gate of said first transistor is coupled to said second node.

2. The power supply circuit of claim 1, wherein said power source is configured to output said first control signal at one of a ground potential, a first predetermined voltage, or a second predetermined voltage, said first predetermined voltage being greater than a threshold voltage of said first transistor and said second predetermined voltage being greater than said first predetermined voltage.

3. The power supply circuit of claim 1, wherein said first output node is coupled to a power input node of a pixel and said second output node is coupled to a signal output node of said pixel.

4. The power supply circuit of claim 3, wherein said power source is configured to output said first control signal at one of a ground potential, a first predetermined voltage, or a second predetermined voltage, said first predetermined voltage being greater than a threshold voltage of said first transistor and said second predetermined voltage being greater than said first predetermined voltage.

5. The power supply circuit of claim 4, wherein said power source is configured to output:
said first control signal at said second predetermined voltage when said pixel is outputting a reset signal; and
said power source is configured to output said first control signal at said ground potential when said pixel is not outputting a reset signal.

6. The power supply circuit of claim 4, wherein said power source is configured to accept a second control signal and said power source is configured to output said first control signal at either said ground potential or said second potential based upon a state of said second control signal.

7. The power supply circuit of claim 3, wherein said power source is configured to output said first control signal at either a first predetermined voltage or a second predetermined voltage, said first predetermined voltage being greater than a threshold voltage of said first transistor and said second predetermined voltage being greater than said first predetermined voltage.

8. The power supply circuit of claim 7, wherein said power source is configured to output:
said first control signal at said second predetermined voltage when said pixel is outputting a reset signal; and
said first control signal at said first predetermined voltage when said pixel is not outputting a reset signal.

9. The power supply circuit of claim 7, wherein said power source is configured to accept a second control signal and said power source is configured to output said first control signal at either said first or second predetermined voltages based upon a state of said second control signal.

10. The power supply circuit of claim 1, further comprising:

a first external control node, for accepting a first external control signal,
wherein each of said plurality of taps further comprises a second transistor,
wherein said second transistor is coupled in series via a source or drain region and a drain or source region between the source and the drain of said first transistor and said second output node, and
wherein a gate of said second transistor is coupled to said first external control node.

11. A method of powering a pixel having a power input node and a signal output node, said method comprising:
supplying a first bias current to said power input node of said pixel; and
supplying a second bias current to said signal output node of said pixel,
wherein said second bias current is supplied to said signal output node only when an output at said signal output node is below a predetermined output level.

12. A method of powering a pixel having a power input node and a signal output node, said method comprising:
supplying a first bias current to said power input node of said pixel;
supplying a second bias current to said signal output node of said pixel; and
setting a level of said second bias current to be at either a first predetermined level or a second predetermined level.

13. The method of claim 12, wherein said setting step is based on a state of an external control signal.

14. A method of powering a pixel having a power input node and a signal output node, said method comprising:
supplying a first bias current to said power input node of said pixel; and
supplying a second bias current to said signal output node of said pixel,
wherein said second bias current is supplied to said pixel only when said pixel is substantially saturated while outputting a photo signal.

15. A method of powering a pixel having a power input node and a signal output node, said method comprising:
supplying a first bias current to said power input node of said pixel; and
supplying a second bias current to said signal output node of said pixel,
wherein said second bias current is supplied to said pixel only when a reset signal reaches an out of bound level.

16. A power supply circuit, comprising:
a power source, said power source having a first node supplying a first power signal and a second node supplying a first control signal; and
a plurality of taps, each of said taps coupled to said power source, each of said taps comprising:
a output node, coupled to said power source and receiving said power signal from said first node; and
a bypass circuit path, said bypass circuit path having power input node coupled to said first node, a control node coupled to said second node, and an output node for outputting a second power signal.

17. An imager, comprising:
a pixel array, having a plurality of pixels organized into a plurality of rows and a plurality of columns;
a power supply circuit, coupled to each pixel of said pixel array, said power supply circuit comprising:
the power supply circuit of claim 1,
wherein each one of said plurality of taps supplies power to at least one of said plurality of pixels.

18. An imager, comprising:
a pixel array, having a plurality of pixels organized into a plurality of rows and a plurality of columns; and
the power supply circuit of claim 16, the power supply being coupled to each pixel of said pixel array.

19. A processor-based system, comprising:
a processing device, said processing device comprising:
a processor;
a memory, coupled to said processor;
an I/O controller, coupled to said processor; and
the imager of claim 17, said imager further comprising:
a control circuit, said control circuit being coupled to said I/O controller and to said pixel array,
wherein each one of said plurality of taps supplies power to at least one of said plurality of pixels.

20. A method of powering a pixel having a power input node and a signal output node, said method comprising:
supplying a first bias current to said power input node of said pixel;
supplying a second bias current to said signal output node of said pixel;
outputting, at said signal output node, a first output signal; and
outputting, at said signal output node, a second output signal,
wherein a current level of said second bias signal is increased when a current level of said first bias signal is decreased.

21. A method of powering a pixel having a power input node and a signal output node, said method comprising:
supplying a first bias current to said power input node of said pixel;
supplying a second bias current to said signal output node of said pixel;
outputting, at said signal output node, a first output signal; and
outputting, at said signal output node, a second output signal,
wherein a current level of said second bias signal is increased as incident light upon said pixel is increased.

22. A method of powering a pixel having a power input node and a signal output node, said method comprising:
supplying a first bias current to said power input node of said pixel;
supplying a second bias current to said signal output node of said pixel;
outputting, at said signal output node, a first output signal; and
outputting, at said signal output node, a second output signal,
wherein a combined current level of said first bias current and said second bias current is substantially invariant with respect to a level of incident light upon said pixel.

* * * * *